United States Patent [19]

Ackeret

[11] Patent Number: 4,694,957
[45] Date of Patent: Sep. 22, 1987

[54] CONTAINER FOR FLAT RECORDING MEDIA

[76] Inventor: Peter Ackeret, Allmendstr. 18, CH-8700 Kusnacht, Switzerland

[21] Appl. No.: 943,550

[22] Filed: Dec. 18, 1986

Related U.S. Application Data

[63] Continuation of Ser. No. 645,061, Aug. 28, 1984, abandoned.

[30] Foreign Application Priority Data

Aug. 29, 1983 [EP] European Pat. Off. ......... 83108481.9

[51] Int. Cl.$^4$ .............................................. B65D 85/57
[52] U.S. Cl. .................................... 206/309; 206/444; 312/12; 312/16; 312/322
[58] Field of Search ................................ 206/309–313, 206/387, 444; 312/8–19, 273, 274, 302, 322

[56] References Cited

U.S. PATENT DOCUMENTS

| | | | |
|---|---|---|---|
| 1,076,993 | 10/1913 | Pooler | 312/12 |
| 1,850,790 | 3/1932 | Cunningham . | |
| 2,720,204 | 10/1955 | Wallach | 206/309 |
| 2,881,913 | 4/1959 | Kursch | 206/313 |
| 3,144,943 | 8/1964 | Punt | 312/8 |
| 3,752,551 | 8/1973 | Clark | 206/387 |
| 3,836,222 | 9/1974 | Kuntze | 312/10 |
| 3,876,134 | 4/1975 | Rice et al. | 206/312 |
| 3,908,824 | 9/1975 | Takahara | 229/44 R |
| 4,113,091 | 9/1978 | Ackeret | 206/387 |
| 4,231,625 | 11/1980 | Perez et al. | 312/245 |
| 4,399,913 | 8/1983 | Gelardi | 206/387 |
| 4,465,197 | 8/1984 | Grillot | 312/10 |
| 4,501,357 | 2/1985 | Park | 206/444 |

FOREIGN PATENT DOCUMENTS

| | | | |
|---|---|---|---|
| 2757249 | 7/1979 | Fed. Rep. of Germany | 312/12 |
| 0685404 | 7/1930 | France . | |
| 0976158 | 3/1951 | France . | |
| 0282442 | 9/1948 | Switzerland . | |

*Primary Examiner*—Stephen Marcus
*Assistant Examiner*—Jimmy G. Foster
*Attorney, Agent, or Firm*—Chilton, Alix & Van Kirk

[57] ABSTRACT

A container for storing flat recording media, such as compact discs, has a housing and a plurality of media holders which can be moved between a storage position and an ejected position. The holders each receive a single disc and have a normally closed disc insertion slot which opens when the holder is moved to the ejected position.

38 Claims, 10 Drawing Figures

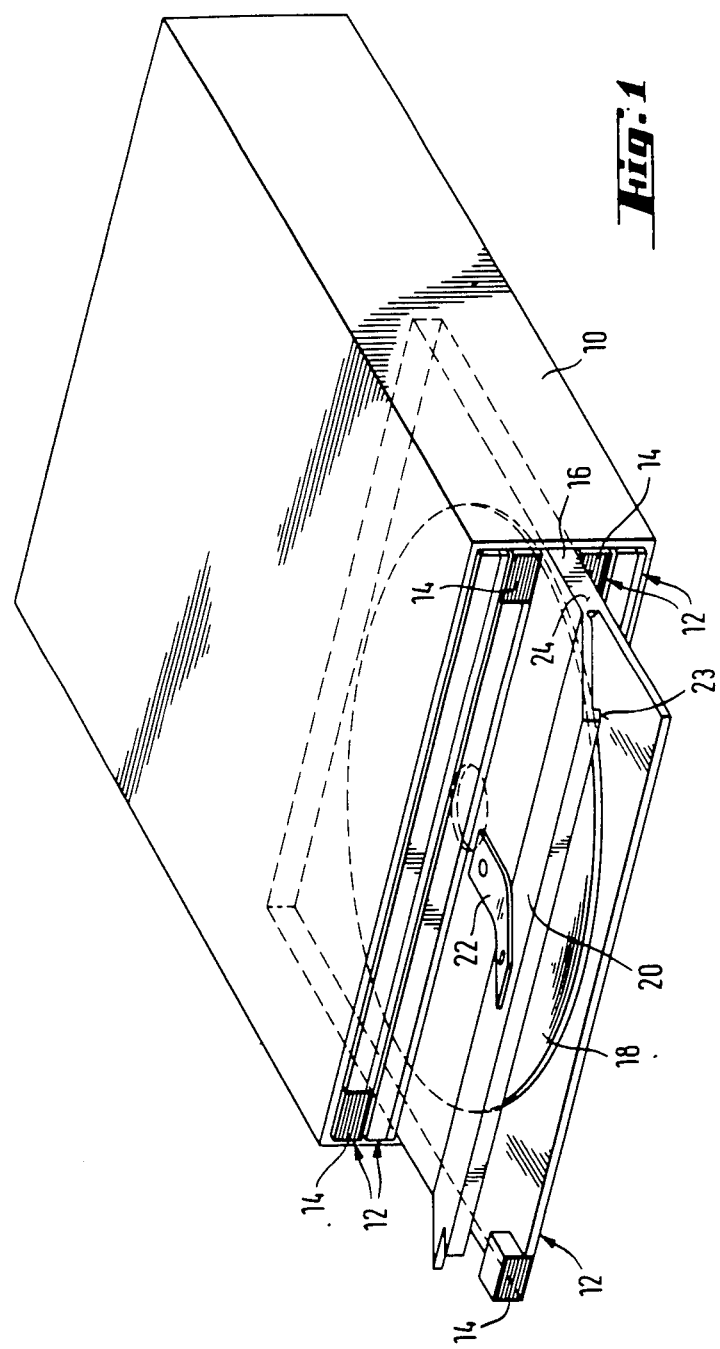

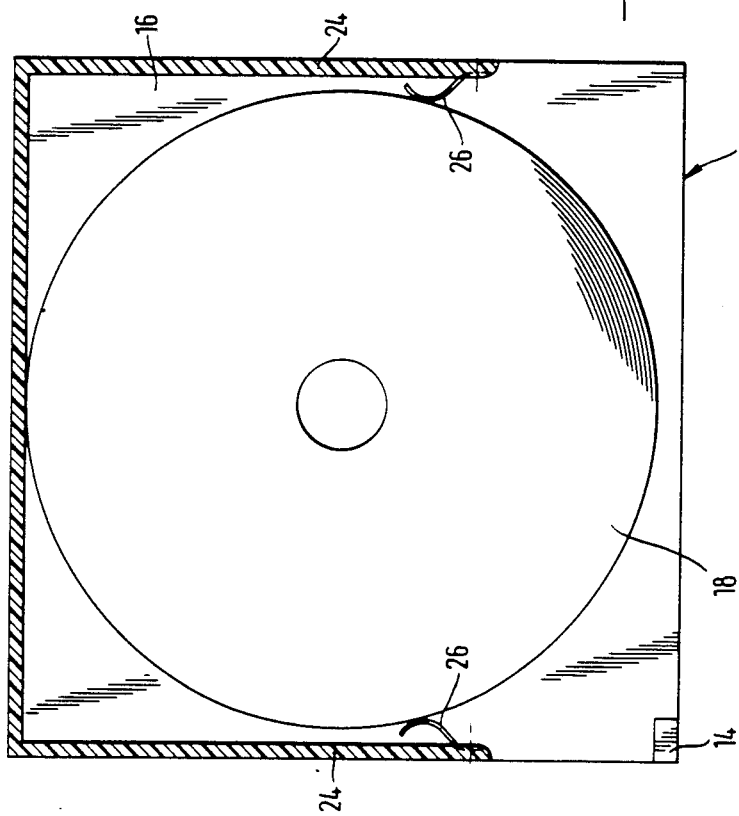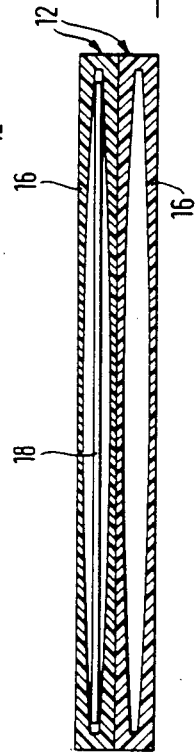

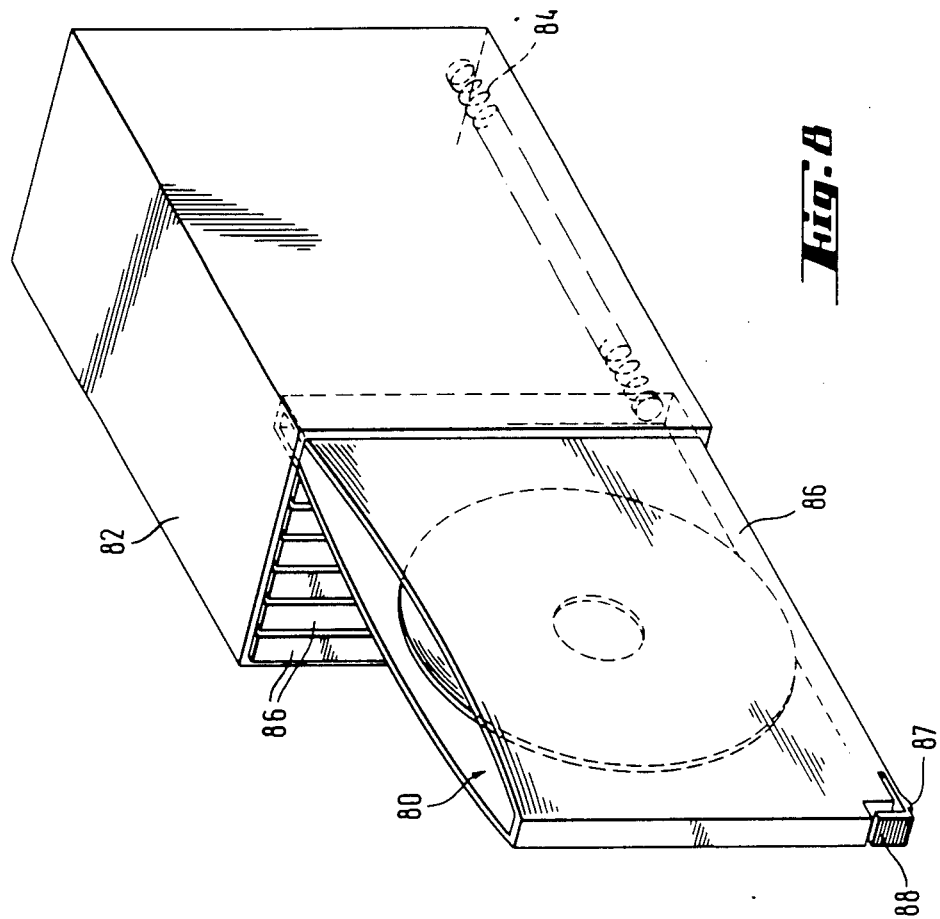

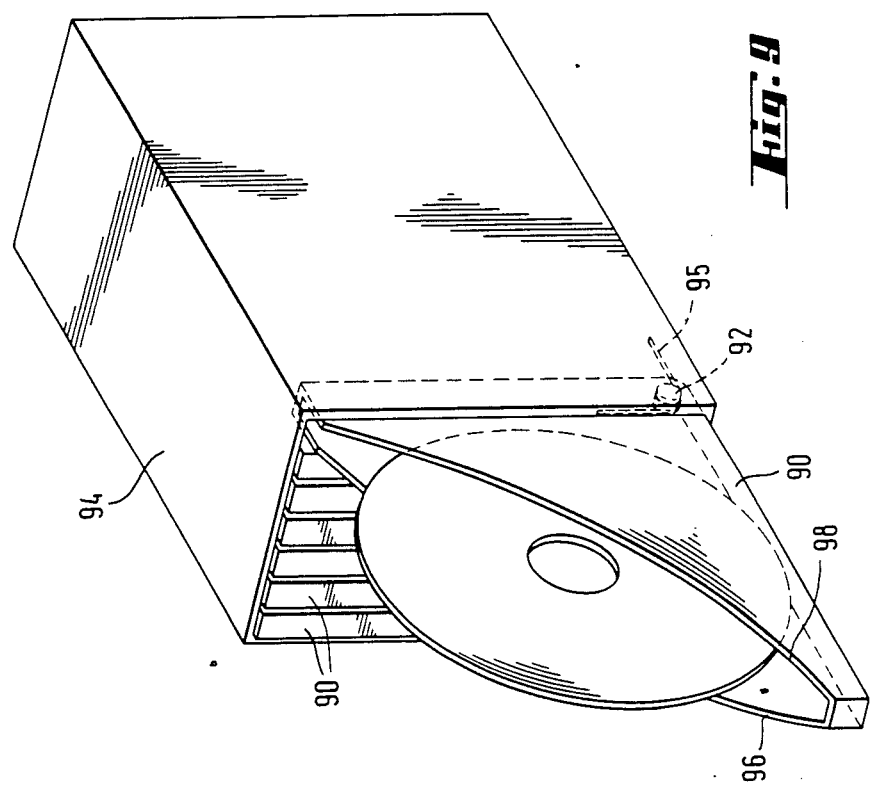

CONTAINER FOR FLAT RECORDING MEDIA

This is continuation of application Ser. No. 645,061, filed Aug. 28, 1984, abandoned.

BACKGROUND OF THE INVENTION (1.) Field of the Invention

The present invention relates to the storage of flat recording media and particularly to facilitating the safe storage and retrieval of "compact" discs. More specifically, this invention is directed to a container which receives, stores and presents for use upon command flat recording media such as compact discs, video discs, floppy discs and the like. Accordingly, the general objects of the present invention are to provide novel and improved methods and apparatus of such character.

(2) Description of the Prior Art

The storage of flat recording media, the so-called "compact discs" for example, presents previously unsolved problems. There have, to be sure, previously been suggested and/or available numerous devices for use in the storage of flat recording media such as the well known 33 rpm long-playing record. The previously available storage devices, however, were basically designed as pieces of furniture and the recording media, when stored therein, was left in a protective envelope or sleeve. While somewhat inconvenient, the storage of recording media in a sleeve or envelope is nevertheless generally considered to be satisfactory in the stationary, i.e., home or office, environment. In recent years disc-form recording media for audio and video signals has become available which, although sensitive to dust, is not effected by finger marks. These recently introduced disc-form recording media, which are employed in optical playback apparatus, are characterized by both high storage density and high quality of reproduction and may safely be handled without a protective sleeve. Playback apparatus for vehicles which accept these "compact discs" have recently become available and this apparatus is becoming competitive with the widely known sound reproduction systems which accept magnetic tape cassettes.

While the problem is certainly not limited thereto, the high density storage of flat recording media in a manner which permits individual discs to be removed from and returned to the storage container with minimal user attention is particularly important in a motor vehicle installation. Thus, in order to insure that attention is not diverted from the primary function of controlling the vehicle, a compact disc storage system should allow the user to withdraw a disc therefrom and subsequently return that disc to storage without need for careful attention to disc positioning. The desire that minimal attention be required for disc storage and retrieval, however, is to some extent inconsistent with a storage system which provides the requisite protection for the stored media.

SUMMARY OF THE INVENTION

The present invention overcomes the above-briefly discussed and other problems by providing a technique, and associated apparatus, for storing flat recording media in such a manner that individual discs or the like may be individually presented for use, are readily accessible in the presentation position, minimal attention is required to return a record disc to the storage system and wherein the discs, when in storage, are closely spaced yet fully protected.

Apparatus in accordance with the present invention comprises a plurality of individual holders for flat record media. The holder are combined into a storage system or magazine having high volumetric efficiency. The system allows the individual holders to be presented to the user for record media removal and, in order to return a record media to storage, the record media need only be brought into general alignment with the holder which then subsequently guides the record media into the storage position in the holder which itself will subsequently be returned to its inserted position in the system.

Individual record disc holders in accordance with the preferred embodiment of the present invention are designed such that the walls of the holder that face the sides of a stored disc are of concave construction. Accordingly, in the storage position and also during insertion and removal, only the outer edge of the disc will contact the holder.

In order to facilitate handing, particularly in the case of a motor vehicle installation, a system in accordance with the present invention includes means for resiliently biasing the individual disc holders toward the removal position and a locking arrangement that retains the holders in the storage position in the housing against the resilient bias.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a perspective view of a recording disc storage system in accordance with a first embodiment of the present invention;

FIG. 2 is a cross-sectional top plan view of a disc holder of the system of FIG. 1;

FIG. 3 is a cross-sectional side elevation view of two of the disc holders of the embodiment of FIG. 1;

FIG. 8 is a perspective view of still another embodiment of the present invention; and FIG. 9 is a perspective view of a further embodiment of the present invention, the embodiment of FIG. 9 comprising a record disc storage system which is a modification of the system of FIG. 8.

DESCRIPTION OF THE DISCLOSED EMBODIMENTS

Figure 4:
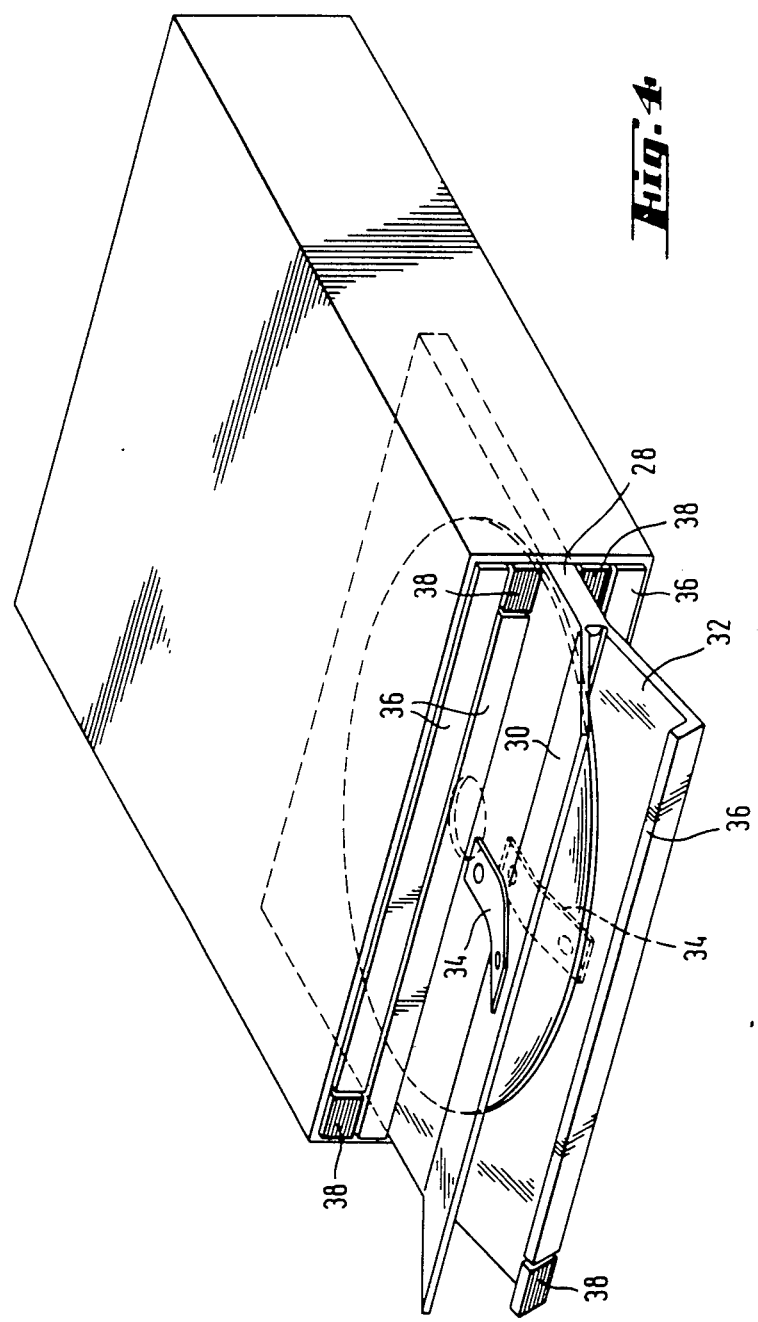
FIG. 4 is a perspective view of a record disc storing system in accordance with a second embodiment of the present invention, the embodiment of FIG. 4 being a modification of the embodiment of FIG. 1.

While the discussion below will be primarily with respect to the storage of so-called "compact discs", and the various embodiments are shown as receiving such "compact discs", it should be understood that the utility of the present invention is not limited thereto. To the contrary, the present invention may be used for the storage of various kinds of flat recording media such as, for example, video discs, floppy discs, and the like.

The container or magazine of the embodiment of FIG. 1 includes a housing 10. Housing 10 receives and supports a plurality of individual holders 12. Each of holders 12 is designed to receive a single record disc. The holders 12 are supported, in the FIG. 1 embodiment, one above the other and are slideable with respect to housing 10 so that they may be moved between an inserted or storage position and an ejected position where the stored disc, one of such discs being indicated at 18, are presented for removal and use. The holders 12 will be individually spring biased toward the disc removal position. The holder which is third from the top in the FIG. 1 embodiment is shown in the ejected or removal position. The extent of travel of the holders 12 will be limited by cooperating mechanical stops on the holders and the interior of the housing. In the inserted position the holders 12 are locked against the bias of the ejection springs. The locking mechanism for each holder may be individually released, a selection button 14 being provided on the front of each holder. In accordance with a preferred arrangement the locking of a holder will automatically occur when it is inserted into the housing 10 from the disc removal position to the point where it contacts a stop and unlocking is accomplished by renewed pressure on the inserted holder until it again contacts the motion limiting stop. Locking mechanisms which function in this manner and are suitable for use in the present invention are disclosed in contemporaneously filed application Ser. No. 645,070 entitled "CONTAINER FOR STORING MAGNETIC TAPE CASSETTES". Other locking mechanisms could, of course, be employed without departing from the spirit and scope of the present invention. It is to be noted that, because of high degree of volumetric efficiency of the disc storage system of FIG. 1, and particularly the very narrow fronts which characterize the individual holders 12, the selection buttons 14 are alternated from left to right to facilitate use of the apparatus.

Each of the individual disc holders 12 comprises a "plate" 16 which by itself or in part defines a carrier having a width which is slightly greater than the diameter of the disc to be received thereon. As may be seen from FIG. 3, these carriers may be in the form of envelopes or storage chambers which are characterized by concave upper and lower walls. When the holder 12 is unlocked and moves to the disc removal position under the influence of its ejection spring, a flap portion 20 at the leading edge of the upper side of the "plate" 16 will automatically open. This automatic opening results from the action of a leaf-type biasing spring 22 and the fact that the flap portion 20 is "hinged" to the remainder of "plate" 16. When the holder is reinserted in housing 10 the flap portion 20 will be cammed downwardly to the closed position by the holder 12 positioned immediately above the holder being inserted or, in the case of the uppermost holder, by the front top edge of housing 10. In the disclosed embodiments each holder 12 will define, in its inserted or storage position, a closed chamber in which a disc 18 may be stored. The closing of the front or leading edge of each holder results from the provision of a downwardly extending lip 22 on flap portion 20, lip 22 and unlocking button 14 cooperating to define a flat, substantially continuous front face for the holder.

Referring to FIG. 2, one of the holders 12 is shown with the top wall of the "plate" 16 removed and a disc 18 positioned therein. The oppositely disposed vertical side wall portions 24 of holder 12 support a pair of oppositely acting leaf-springs 26. The springs 26 are positioned and shaped such that, when the disc 18 is inserted, they are first deflected. As insertion continues, when the width of the disc portion positioned between the springs 26 becomes less than the disc diameter, springs 26 will exert an inwardly directed force on the disc which assists the insertion process. When the holder 12 is ejected from housing 10 the springs 26 will exert a retaining force which prevents the disc from itself being ejected from the holder. The spring arrangement of FIG. 2 may be employed in each of the disclosed embodiments of the present invention. In the interest of facilitating understanding of the invention the spring arrangement of FIG. 2, or an equivalent arrangement, has not been shown with respect to the other disclosed embodiments.

It is to be noted that, in the interest of enhancing the compactness of the storage system, it is possible to eliminate the top wall of the "plates" 16. In such case the individual "plates" will terminate at the top of the vertical walls 24 and the bottom of the holder 12 positioned immediately above in the stacked arrangement will be concave on both sides so that it may serve as the top of the disc-receiving pocket. If the top wall of the "plates" 16 is omitted there will not be a spring biased flap 20.

The profile of the individual holders 12, as best shown in FIGS. 3A and 3B, can be employed in all embodiments of the present invention. This profile insures that only the edges of the disc, and never the portion thereof which contains the recorded information, contacts a portion of the holder.

The embodiment of FIG. 4 differs from that of FIG. 1 primarily in that the front portions of the top and base walls of the "plate" of each holder, a "plate" being indicated at 28 in FIG. 4, are provided with hinged portions. Thus, in the FIG. 4 embodiment each holder has a pair of flaps 30, 32 which are biased in the open direction by springs 34 when the holder is in the ejected, i.e., disc removal, position. In the FIG. 4 embodiment the front of the pocket defined by each "plate" is formed by a lip 36 on flap 32, lip 36 comprising an extension of the selection button 38.

In the embodiment of FIGS. 5A and 5B the holders include U-shaped elements 42 which are slideably guided in the housing 40. The elements 42 are biased toward the disc removal position by means of a spring arrangement, not shown, and are retained in the housing 40 by means of a manually releasable locking mechanism, also not shown. The forwardly extending arms of the U-shaped elements 42 define a frame which supports an envelope defining member indicated generally at 44. The envelope defining member 44 has a bridge 46 at the front edge thereof. The "bridge" 46 is comprised of a resilient member which, in the ejected position of the holder, naturally spreads apart to define an oval-shaped access opening. The ends of the legs of the U-shaped element 42, i.e., the open end of the "U", are interconnected by means of a closure bar 48. Closure bars 48 include parallel side pieces 50 which are pivotally connected to the U-shaped element 42 as shown. In order to remove a disc 18 from the envelope defining member 44, the closure bar 48 is rotated upwardly or downwardly out of alignment with the spread-open bridge 46. The entire envelope defining member 44 can be comprised of a resilient plastic. Alternatively, the bridge member 46 and the lateral side pieces 52, by which the remainder of the envelope defining member 44 is attached to U-shaped element 42 can be fabricated from sheet metal. As may best be seen from FIG. 5B, which is a partial enlarged view of that portion of one of the envelopes 54 of the embodiment of FIG. 5A which is shown within a broken line circle, the envelope is comprised of a plastic film which is clamped onto the bridge member 46 and defines the disc receiving pocket. In either construction as in the embodiments of FIGS. 1 and 4, all rigid portions of the individual record disc holders will be sized and shaped so that they can contact only edge portions of a disc inserted therein.

Figure 5:
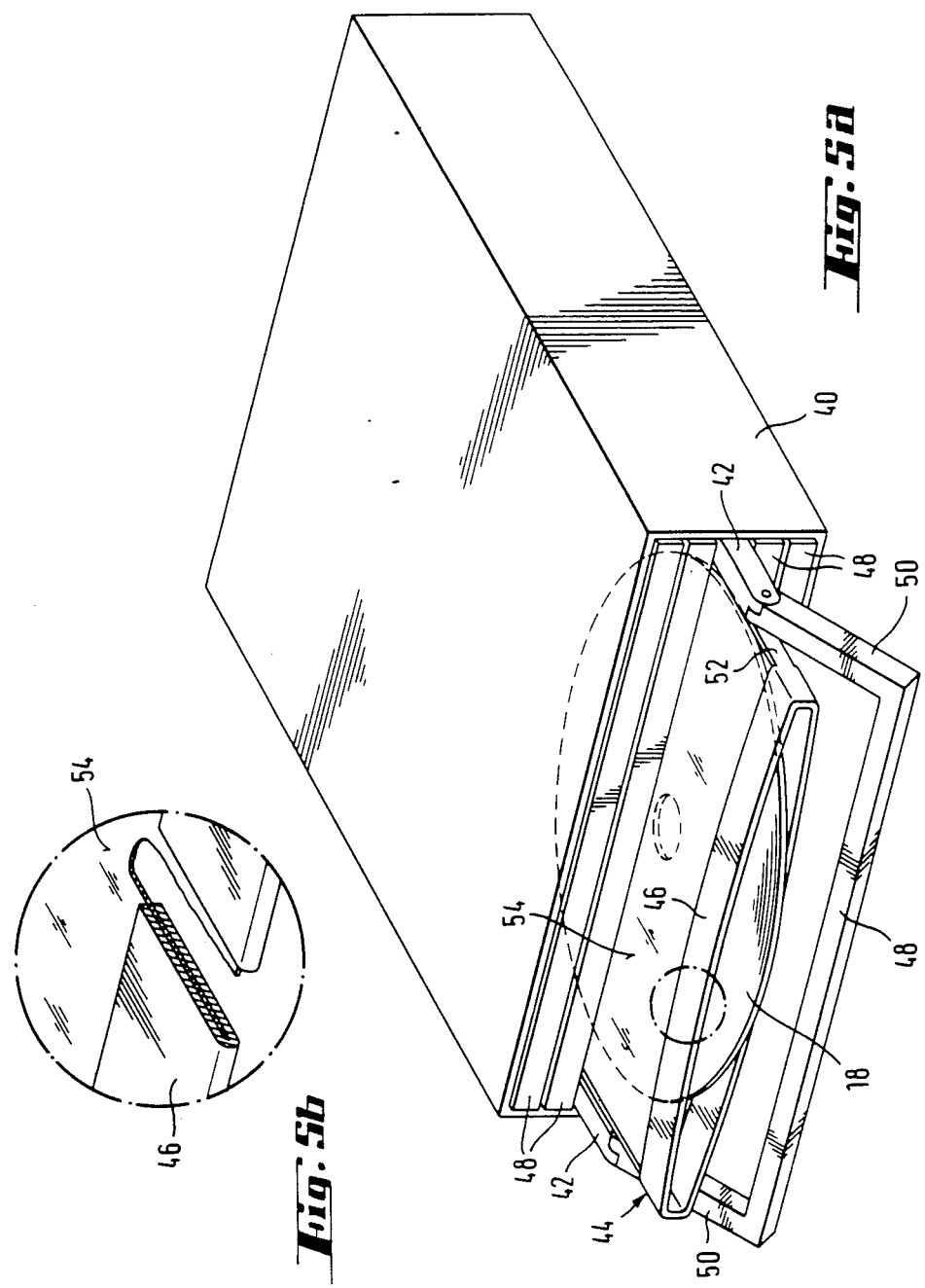
FIG. 5A is a perspective view of a record disc storage system in accordance with a third embodiment of the present invention.
FIG. 5B is a partial enlarged view of the apparatus depicted in FIG. 5A.
Figure 6:
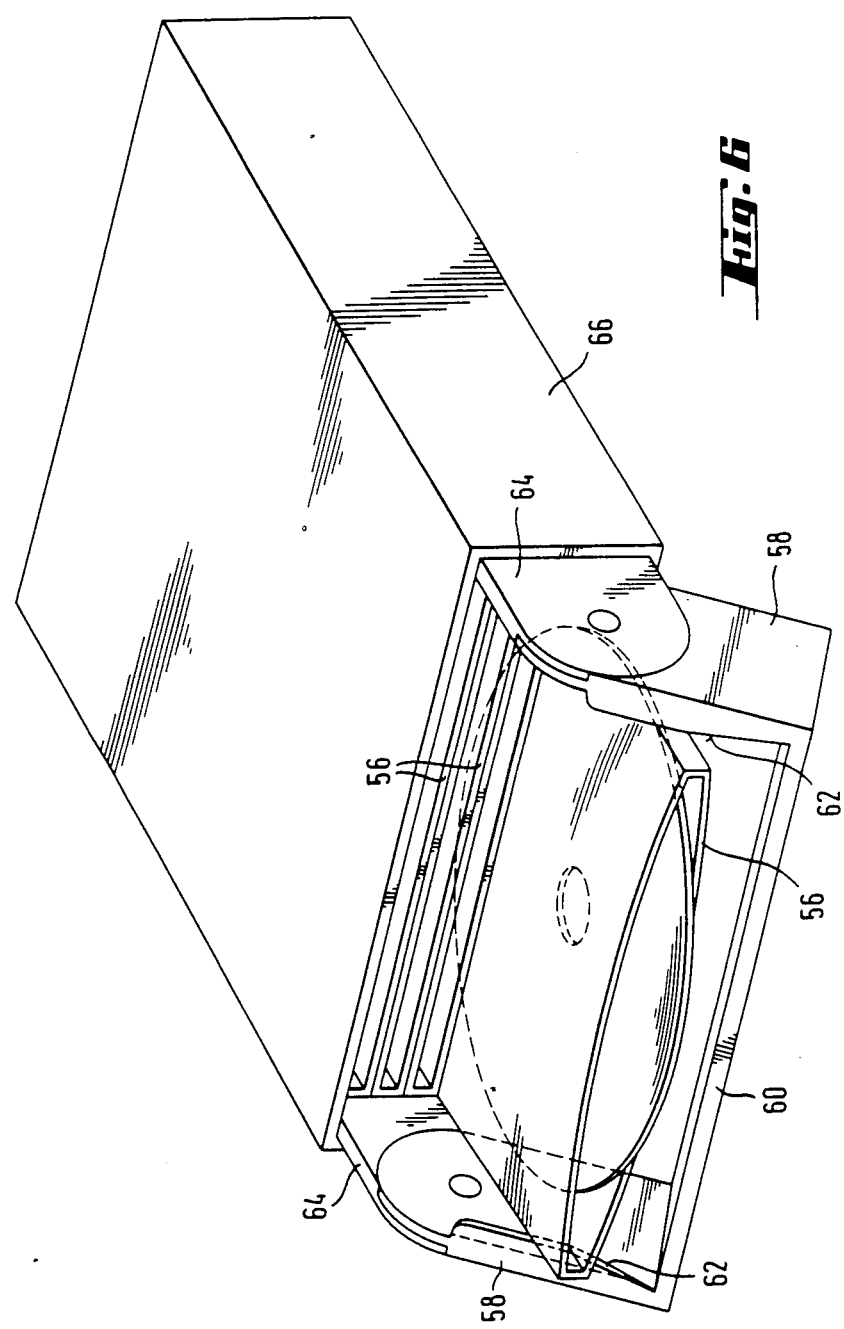
FIG. 6 is a perspective view of apparatus in accordance with a fourth embodiment of the invention, the embodiment of FIG. 6 being a modification of the embodiment of FIG. 5.

In the embodiment of FIG. 6 the envelope defining member 56 is comprised of a resilient plastic. However, unlike the FIG. 5 embodiment wherein the bridge member 46 has a bias toward the open position, the envelope defining member 56 of the FIG. 6 embodiment has a bias toward the closed position. In the FIG. 6 embodiment the closure bar 60 is constructed such that the side pieces 58 thereof have cam surfaces 62 which, when the closure bar is pivoted downwardly, exert a lateral compressive force on member 56. This lateral force, i.e., the narrowing of the space between the opposite edges of the member 56, will result in the opening of the "pocket". In view of the counter-force which acts outwardly, and the size requirements for the camming or wedging surfaces 62, a common U-shaped element 64 is employed in the FIG. 6 embodiment and a selector system, not shown, will insure that the disc holders are only individually ejected.

Figure 7:
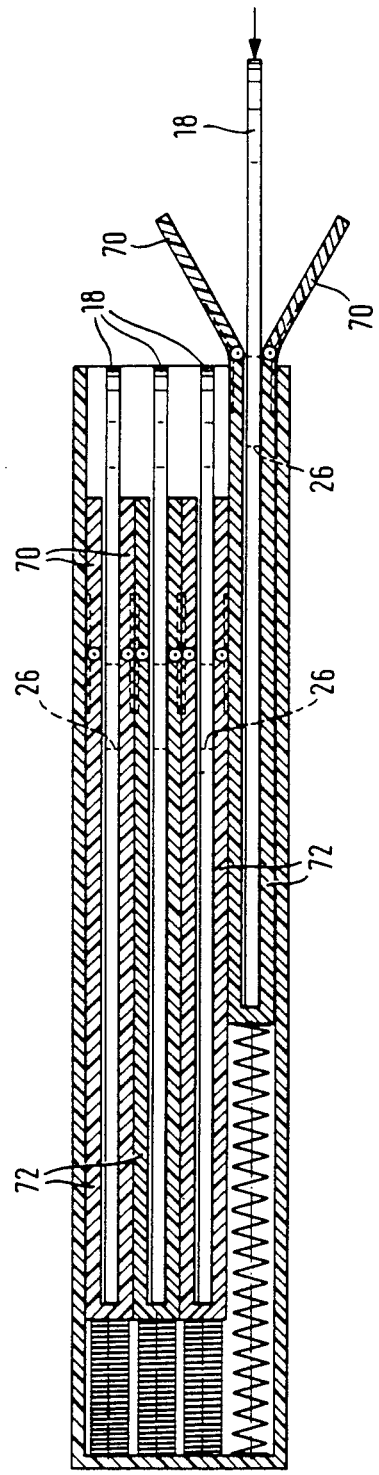
FIG. 7 is a schematic cross-sectional side elevation view of a record disc storage system in accordance with yet another embodiment of the present invention.

FIG. 7 represents a further embodiment of the present invention which is similar to the above-described embodiment of FIG. 4. In the FIG. 7 embodiment, however, the combined depth of the holder and flaps 70 is less than the diameter of a disc to be stored in the holder. Accordingly, an edge portion of a disc 18 will remain accessible and insertion is accomplished by actually pushing on the edge of the disc. A storage system of the type shown in FIG. 7 will, of course, include springs 26 (FIG. 2) or some equivalent means to insure that a disc cannot accidentally be ejected from the storage system in spite of the absence of closure bars.

The disc storage system of FIG. 8 is very similar to that of FIG. 5. However, in the FIG. 8 embodiment the discs are stored vertically in holders 86. The slot 80 will face upwardly when the holder 86 is in the ejected position with respect to housing 82. In FIG. 8 an ejection spring for one of the holders is indicated schematically at 84 while a selector button, for unlocking the holder 86 to permit ejection thereof, is indicated at 88.

The embodiment of FIG. 9 is very similar to that of FIG. 8 with the primary difference residing in the fact that the individual holders 90 are generally triangular shaped when viewed from the side. In the FIG. 9 embodiment the individual holders 90 are pivoted about a pin 92 which is located adjacent the lower front corner of housing 94. The holders 90 will be spring biased toward the disc removal position and, when in the disc removal position, the edges 96, 98 will spread apart due to the inherent resilient loading of the material from which the holders are fabricated.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for use in the storage of disc-shaped flat recording media comprising:
   housing means, said housing means defining an interior space having an access opening on one side thereof;
   a plurality of media holders mounted in said housing means for individual movement relative to said housing means and through said opening, said media holders being mounted such that recording media positioned thereon may be displaced in generally parallel planes between a storage position where such recording media is located entirely within said housing means and an ejected position where the recording media is at least in part positioned outside of said housing means for removal from said holders, each of said holders including:
   at least a first rigid plate member, said first plate member being provided with a surface recess commensurate in size with the recording media to be stored, said recess being deeper in the center region than in the edge region whereby a recording media positioned therein will be supported only by a portion thereof adjacent its edge;
   means defining a recording media insertion slot at a first end of the holder; and
   means defining a generally rectangularly shaped media holder front wall, the front wall covering the insertion slot of the holder when the holder is in the storage position, said front wall defining means being displacably connected to the holder for movement of said front wall into and out of registration with the insertion slot, the front wall being oriented substantially transversely with respect to the plane of movement of a stored recording media when the holder is in the storage position, the front wall being spaced in close proximity to the front wall of adjacent holders when the holder is in the storage position whereby said front walls cooperate to substantially entirely cover said housing means access opening when all of said holders are in the storage position; and
   means for resiliently biasing each of said holders toward the ejected position.

2. The apparatus of claim 1 wherein said holder insertion slot defining means each at least in part comprises a resiliently biased wall portion.

3. The apparatus of claim 2 wherein each of said wall portions is biased toward the open condition and the slot defined thereby is closed by movement of the holder into said housing means.

4. The apparatus of claim 2 wherein said insertion slot defining means comprises:
   a pair of oppositely acting resilient wall portions, said wall portions being biased toward one another to establish the closed condition of the insertion slot; and wherein said apparatus further comprises:
   means for applying a force to said resilient wall portions, said force being sufficient to overcome the said oppositely acting bias to thereby cause said resilient wall portions to move away from one another.

5. The apparatus of claim 4 wherein said force applying means comprises:
lever operated cam means, said cam means contacting the opopsite ends of both of said resilient wall portion and applying a force thereto which is generally transverse to the direction of said resilient bias.

6. The apparatus of claim 1 wherein each of said holders further comprises:
at least a pair of parallel side walls extending in the same direction from said plate, portions of said side walls in part comprising said insertion slot defining means.

7. The apparatus of claim 6 wherein the side walls of each of said holders are spaced apart by a distance greater than the maximum dimension of a recording media to be stored in said holders and wherein said holders each comprise:
retaining spring means mounted on each of said side walls, said retaining spring means being positioned to contact the edges of a recording media and to exert a force thereon in the insertion direction.

8. The apparatus of claim 6 wherein said holders each further comprise:
a second plate, said second plate bridging said side walls and being provided with a surface recess which has substantially the same size and shape as the surface recess in said first plate, said recess facing one another whereby a stored record media is supported so that it spans a cavity disposed between said plates, said cavity being generally oval in cross-section.

9. The apparatus of claim 7 wherein each of said holders further comprises:
a second plate, said second plate bridging said side walls and being provided with a surface recess which has substantially the same size and shape as the surface recess in said first plate, said recesses facing one another whereby a stored record media is supported so that it spans a cavity disposed between said plates.

10. The apparatus of claim 8 wherein said front wall defining means each comprise a hinged flap portion at a leading edge of at least one of said plates, said flap portions in part also comprising said insertion slot defining means, and wherein said holders each further comprise:
means for biasing said flap portion away from the other of said plates whereby said insertion slot will open when the holder is moved to the ejected position.

11. The apparatus of claim 8 wherein both of said plates of each of said holders are provded with hinged portions adjacent the leading edges thereof, said hinged portions also comprising said insertion slot defining means, and wherein each of said holders further comprises;
means for resiliently biasing said hinged portions away from one another whereby said insertion slot will open when the holder is moved to the ejected position.

12. The apparatus of claim 10 wherein the holder front walls defined by said front wall defining means are oriented generally transversely with respect to said holder parallel side walls when said flap portions are in the insertion slot closed position.

13. The apparatus of claim 12 wherein said side walls of each of said holders are spaced apart by a distance which is greater than the maximum dimension of a recording media to be stored in the holders and wherein each of said holders further comprises:
retaining spring means mounted on each of said side walls, said retaining spring means being positioned to contact the edges of a recording media and to exert a force thereon in the insertion direction.

14. The apparatus of claim 11 wherein the front wall of each of said holders is integral with one of said hinged portions and is oriented generally transversely with respect to said parallel side walls when said one hinged portion is in the insertion slot closed position.

15. The apparatus of claim 1 wherein each of said holders is slideably positioned within said housing means.

16. The apparatus of claim 13 wherein each of said holders is slideably positioned within said housing means.

17. The apparatus of claim 14 wherein each of said holders is slideably positioned within said housing means.

18. The apparatus of claim 1 wherein each of said holders is pivotally mounted with repsect to said housing means.

19. The apparatus of claim 1 wherein said holders additionally each comprise:
means for resiliently biasing said insertion slot defining means to cause said slot to assume an open recording media insertion condition when the holder is displaced from the storage to the ejected position.

20. The apparatus of claim 19 wherein said holder front wall defining means are integral with at least a part of an associated insertion slot defining means and cooperate therewith to form an insertion slot, said front wall defining means each including a base member extending transversely with respect to a front wall member to a hinge displaced inwardly from the unction of said front and base members, said hinge underlining a flat recording media positioned on the holder.

21. The apparatus of claim 1 further comprising:
resilient means for retaining disc-shaped recording media on said plate members by contacting the edge of the recording media.

22. The apparatus of claim 21 wherein said holders each further comprise;
at least a pair of parallel side walls extending in the same direction from said plate; and wherein said resilient retaining means each comprise:
retaining spring means mounted on each of said holder side walls, said retaining spring means being configured to exert a force on recording media disposed in the surface recess of the holder, said force being in the insertion direction of the holder.

23. The apparatus of claim 15 further comprising:
resilient means for retaining disc-shaped recording media on said plate members by contacting the edge of the recording media.

24. The apparatus of claim 23 wherein said holders each further comprise:
at least a pair of parallel side walls extending in the same direction from said plate: and wherein said resilient retaining means each comprise:
retaining spring means on each of said holder side walls, said retaining spring means being configured to exert a force on recording media disposed in the surface recess of the holder, said force being in the insertion direction of the holder.

25. The apparatus of claim 1 wherein said first plate member of each of said media holders is provided with a hinged flap portion at a leading edge thereof.

26. The apparatus of claim 21 wherein said first plate member of each of said media holders is provided with a hinged flap portion at a leading edge thereof.

27. The apparatus of claim 22 wherein said first plate member of each of said media holders is provided with a hinged flap portion at a leading edge thereof.

28. The apparatus of claim 23 wherein said first plate member of each of said media holders is provided with a hinged flap portion at a leading edge thereof.

29. The apparatus of claim 24 wherein said first plate member of each of said media holders is provided with a hinged flap portions at a leading edge thereof.

30. The apparatus of claim 21 wherein said retaining means are mounted on said holders.

31. The apparatus of claim 30 wherein said retaining means are in contact with recording media located in the surface recesses at all positions of the said holders.

32. The apparatus of claim 21 wherein said retaining means frictionally engage the recording media.

33. The apparatus of claim 21 wherein said retaining means each comprise at least a first resilient member.

34. The apparatus of claim 33 wherein said resilient members are springs.

35. The apparatus of claim 21 wherein said retaining means are in engagement with edge portions of recording media located in the holder surface recesses, the retaining means acting on recording media engaged thereby in the region of the recording media which is disposed between the center thereof and the portion of the recording media which is in closest proximity to the holder front walls.

36. The apparatus of claim 21 wherein the retaining means are adapted to yield sufficiently to permit passage of the disc-shaped recording media.

37. The apparatus of claim 36 wherein said retaining means exert an insertion force upon recording media, said force being in a direction which is away from the holder front walls, said force being applied to the recording media after said retaining means have yielded to permit passage of the diameter of the recording media during delivery thereof to a holder.

38. The apparatus of claim 21 wherein said holders each have a pair of side walls, said side walls extending in the direction of holder movement, and wherein said retaining means are mounted on a least one of said side walls of each of said holders.

* * * * *